Aug. 15, 1933.  J. P. ROCK  1,922,457
SHOCK ABSORBER
Filed Nov. 20, 1931
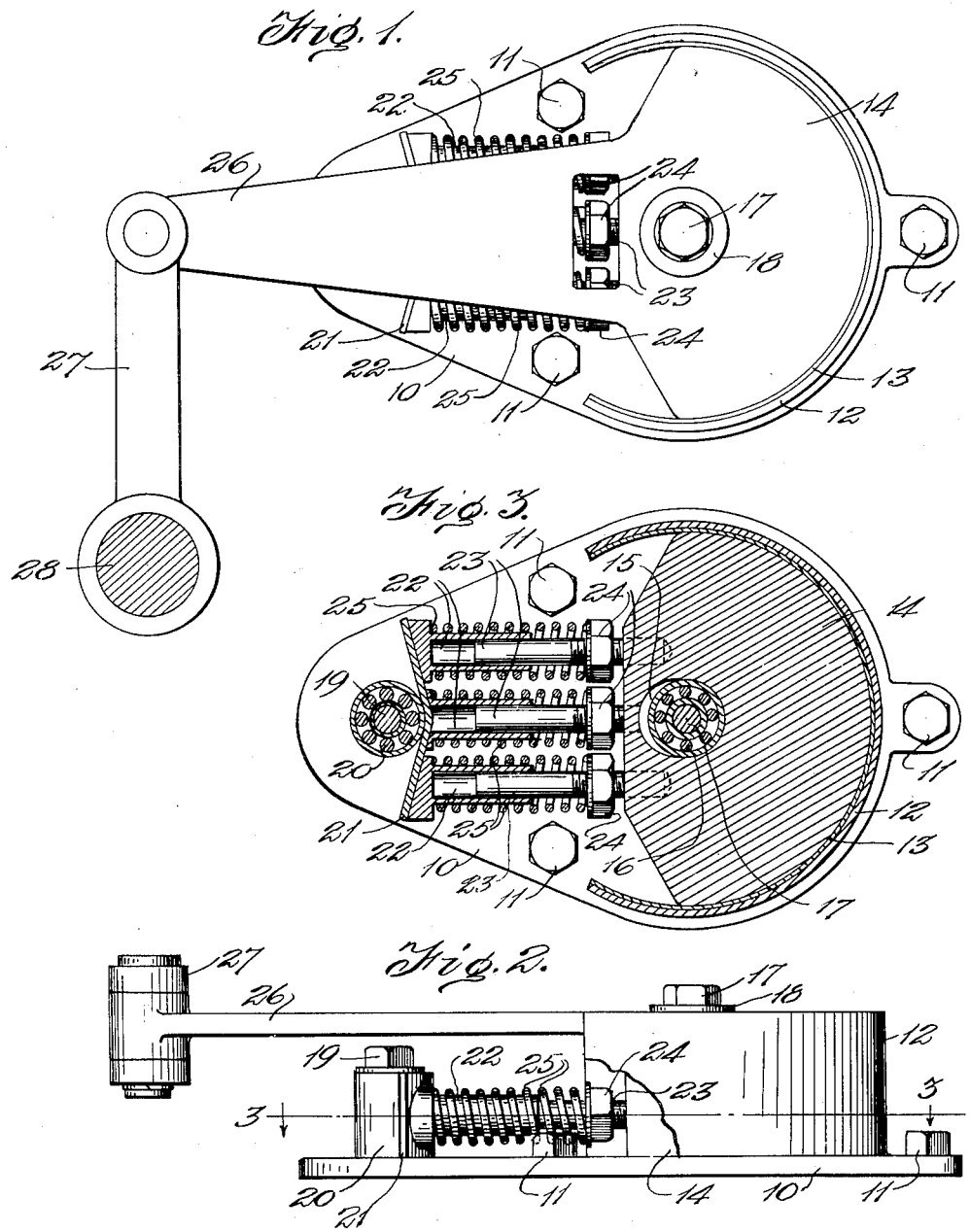
Inventor
John P. Rock,
By 〈signature〉
Attorney Patented Aug. 15, 1933

1,922,457

UNITED STATES PATENT OFFICE 1,922,457

SHOCK ABSORBER

John Paul Rock, Duluth, Minn.

Application November 20, 1931
Serial No. 576,402

3 Claims. (Cl. 267—9)

This invention relates to shock absorbers such as are used on automobiles and other like vehicles.

One important object of the invention is to provide an improved and novel general construction of devices of this character.

A second important object of the invention is to provide a novel device of this character operating by braking effect applied to a rocking member.

A third important object of the invention is to provide a device of this character having novel means to apply pressure to the braking means in accordance with the extent of deviation of the axle from normal position relative to the vehicle frame.

A fourth important object of the invention is to provide a novel construction of device of this kind wherein the wear on the brake is taken up automatically.

A fifth important object of the invention is to provide a device of this character having a novel adjustable spring arrangement for varying the braking effect.

With the above and other objects in view, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a face view of one of these shock absorbers.

Figure 2 is a top view, partly broken away, of one of these shock absorbers.

Figure 3 is a section on the line 3—3 of Figure 2.

In carrying out this invention and in the particular embodiment here shown there is provided a base plate 10 which may be secured to a suitable place on the frame or chassis of a vehicle by suitable bolts 11. Extending around one end of this plate is an arcuate wall or band 12 on the inner face of which is secured a brake lining 13. This band is somewhat greater in extent than one half of a circle. Seated in the space within this band is a brake block 14 having a substantially semi-circular bearing surface which engages against the lining 13. This block has a slightly elongated opening 15 wherein is fitted a ball or roller bearing 16 the outer race of which fits in the opening 15 to move slightly to and fro in this opening. A bolt 17 passes through the bearing 16 and is screwed into the plate 10 concentric to the band 12, a washer 18 covering the bearing and its opening and holding the block 14 in place.

Adjacent the opposite end of the plate 10 is a bolt 19 whereon is fitted a ball or roller bearing 20. Against this bearing rests a double camming plate 21 having an arcuate central portion normally resting on the bearing. From this central portion extend flat wings or arms which are arranged at an obtuse angle to each other. Secured to this cam plate is a set of three guide tubes 22 the central one of which is normally aligned between the bolts 17 and 19 and the others are parallel thereto on opposite sides of said central member. Projecting from the head or block 14 are pins 23 which enter the tubes 22 and are slidable therein. Threaded on these pins are adjusting nuts 24 and between these nuts and the bases of the tubes 22 are coiled compression springs 25 which constantly urge the cam plate 21 and head 14 apart. These springs may have their tension adjusted by the nuts 24.

Projecting from the head or block 14 is an arm 26 which is connected by a link 27 with the axle as indicated at 28.

Obviously, as relative movement occurs between the frame of the vehicle and the axle the arm 26 will be rocked up or down in accordance with the direction of such movement. This motion will be resisted or damped by the friction between the head 14 and brake lining 13 and, as the motion takes place one or the other of the wings of the cam plate 21 will roll over the bearing 20 thus compressing the springs 25 to an extent corresponding to the extent of movement of the arm 26 so that the frictional resistance to movement will be correspondingly increased. Furthermore, due to the elongated form of the opening 15 close contact between the head and brake lining will at all times be maintained. Under these conditions the shocks due to road travel of the vehicle and rebound therefrom will be absorbed by this frictional resistance and the vehicle will ride smoothly.

There has thus been provided a simple and efficient device of the kind described and for the purpose specified.

It is obvious that changes may be made in the form and construction of the invention without departing from the principles thereof. It is therefore desired that the invention shall be understood to cover all such changes as come within the scope claimed.

Having thus described the invention, what is claimed is:

1. In a shock absorber, an arcuate brake band fixed against movement, a brake head fitted in said brake band to engage the band and rock concentrically thereof, an arm extending from said head to rock therewith, a link carried by said arm and adapted to connect the arm to an axle, a stud spaced from said head and fixed against movement in respect to said band, a cam plate supported by said stud on the side next said head and having divergent wings at an obtuse angle to each other, guide tubes projecting from said plate toward said head, pins carried by the head and extending into said tubes telescopically, and springs surrounding said tubes and pins and urging them to protracted positions, said head being mounted to permit bodily movement toward and away from said brake band.

2. In a shock absorber, an arcuate brake band fixed against movement, a brake head fitted in said brake band to engage the band and rock concentrically thereof, an arm extending from said head to rock therewith, a link carried by said arm and adapted to connect the arm to an axle, a stud spaced from said head and fixed against movement in respect to said band, a cam plate supported by said stud on the side next said head and having divergent wings at an obtuse angle to each other, guide tubes projecting from said plate toward said head, pins carried by the head and extending into said tubes telescopically, springs surrounding said tubes and pins and urging them to protracted positions, and means to adjust the tension of said springs, said head being mounted to permit bodily movement toward and away from said brake band.

3. In a shock absorber, an arcuate brake band fixed against movement, a brake head fitted in said brake band to engage the band and rock concentrically thereof, an arm extending from said head to rock therewith, a link carried by said arm and adapted to connect the arm to an axle, a stud spaced from said head and fixed against movement in respect to said band, a cam plate supported by said stud on the side next said head and having divergent wings at an obtuse angle to each other, guide tubes projecting from said plate toward said head, pins carried by the head and extending into said tubes telescopically, springs surrounding said tubes and pins and urging them to protracted positions, and adjusting nuts screwed on said pins and supporting said springs in tension adjusted positions, said head being mounted to permit bodily movement toward and away from said brake band.

JOHN PAUL ROCK.